US012596613B2

(12) United States Patent
Rosenfeld et al.

(10) Patent No.: US 12,596,613 B2
(45) Date of Patent: Apr. 7, 2026

(54) DISTRIBUTED HYBRID BUFFER FOR MEMORY SYSTEMS

(71) Applicant: Micron Technology, Inc., Boise, ID (US)

(72) Inventors: Paul Rosenfeld, Rockville, MD (US); Robert Walker, Raleigh, NC (US); Cagdas Dirik, Indianola, WA (US)

(73) Assignee: Micron Technology, Inc., Boise, ID (US)

( * ) Notice: Subject to any disclaimer, the term of this patent is extended or adjusted under 35 U.S.C. 154(b) by 66 days.

(21) Appl. No.: 18/785,951

(22) Filed: Jul. 26, 2024

(65) Prior Publication Data

US 2026/0030105 A1     Jan. 29, 2026

(51) Int. Cl.
*G06F 11/10*          (2006.01)
*G06F 13/16*          (2006.01)
(52) U.S. Cl.
CPC ...... *G06F 11/1076* (2013.01); *G06F 11/1004* (2013.01); *G06F 13/1673* (2013.01)
(58) Field of Classification Search
CPC .............. G06F 11/108; G06F 11/1004; G06F 11/1068; G06F 11/1076; G06F 13/1673
See application file for complete search history.

(56) References Cited

U.S. PATENT DOCUMENTS

| | | | |
|---|---|---|---|
| 2016/0253125 A1* | 9/2016 | Bennett ................. | G06F 3/0689 |
| | | | 711/103 |
| 2019/0146911 A1* | 5/2019 | Ha ...................... | G06F 12/0246 |
| | | | 711/103 |
| 2019/0347161 A1* | 11/2019 | Margetts ............. | G06F 11/1076 |
| 2021/0055985 A1* | 2/2021 | Lee ...................... | G11C 29/028 |

* cited by examiner

*Primary Examiner* — Shelly A Chase
(74) *Attorney, Agent, or Firm* — Schwegman Lundberg & Woessner, P.A.

(57)          ABSTRACT

A system may include a memory and memory controller configured to communicate with the memory over two or more channels. The memory controller may have a buffer with buffer locations distributed across memory channels, and may be configured to receive a write command for writing current data to a memory location within the memory and may be configured to determine whether to buffer data and/or parity, and configured to write the current data or the current parity in the buffer when it is determined to be stored in the buffer. As the buffer is faster and uses less power, the reduction in back-end accesses improves performance and reduces power consumption.

20 Claims, 15 Drawing Sheets

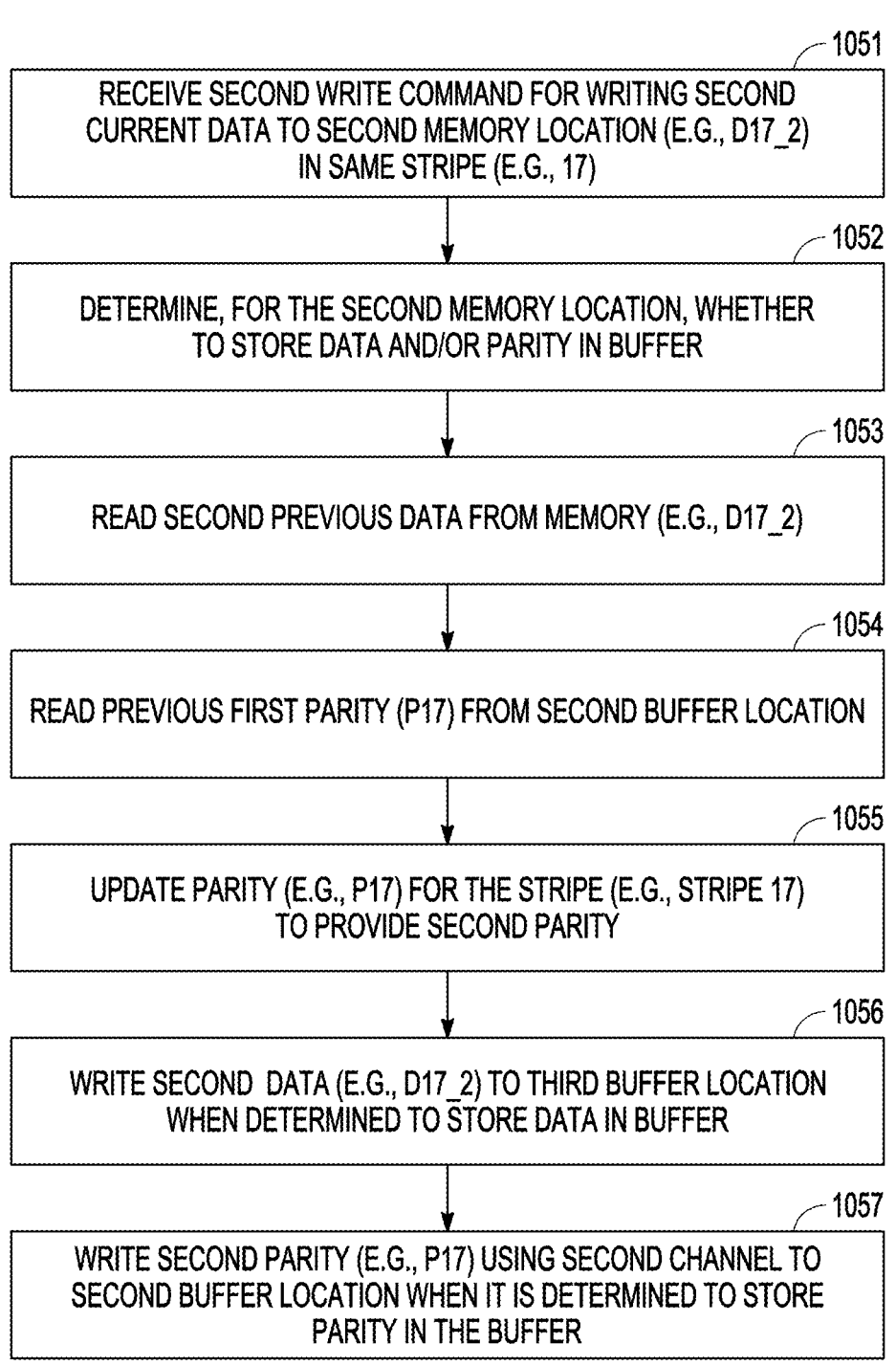

1051

RECEIVE SECOND WRITE COMMAND FOR WRITING SECOND CURRENT DATA TO SECOND MEMORY LOCATION (E.G., D17_2) IN SAME STRIPE (E.G., 17)

1052

DETERMINE, FOR THE SECOND MEMORY LOCATION, WHETHER TO STORE DATA AND/OR PARITY IN BUFFER

1053

READ SECOND PREVIOUS DATA FROM MEMORY (E.G., D17_2)

1054

READ PREVIOUS FIRST PARITY (P17) FROM SECOND BUFFER LOCATION

1055

UPDATE PARITY (E.G., P17) FOR THE STRIPE (E.G., STRIPE 17) TO PROVIDE SECOND PARITY

1056

WRITE SECOND DATA (E.G., D17_2) TO THIRD BUFFER LOCATION WHEN DETERMINED TO STORE DATA IN BUFFER

1057

WRITE SECOND PARITY (E.G., P17) USING SECOND CHANNEL TO SECOND BUFFER LOCATION WHEN IT IS DETERMINED TO STORE PARITY IN THE BUFFER

FIG. 10

DISTRIBUTED HYBRID BUFFER FOR MEMORY SYSTEMS

TECHNICAL FIELD

This document relates generally to computer storage, and more particularly but not limited to systems, devices and methods for improving memory performance.

BACKGROUND

Design considerations for memory devices may balance competing RAS (Reliability, Availability, Serviceability) characteristics. Reliability refers to the ability of the system to reliably or consistently perform as expected. Availability relates to a percentage of time that the system is functional over the time that it is expected to be functional. Service-ability relates to how easy or difficult it is to diagnose problems, obtain parts, repair the system to be operable again, and the like. These RAS characteristics are competing as improvements in reliability may decrease performance or bandwidth and increase the total cost of ownership, and reductions in the total cost of ownership or increasing performance may decrease reliability.

Recent memory device generations are low power (LP) memories, an example of which is LP5. Enabling RAS on LP5-based memory systems may cause an unacceptable increase in power and/or reduction in performance for some applications. For example, parity bits and extra metadata may be maintained in the memory and managed by the controller in order to support a high level of RAS. Parity may be used in RAID (random array of independent drives) systems where device data may be striped across multiple storage devices. A RAID stripe may include N user data blocks with a corresponding parity block that is computed from all N user data blocks. The parity may be calculated using a logical exclusive-or (XOR) operation and may be updated when a single user data block is written. An example of the extra metadata is an error-detecting code such as cyclic redundancy check (CRC). If CRC is used, the CRC is also updated on the write of the single user data block. This results in a high level of write amplification as a single request from the host may result in multiple back-end requests that were not specifically issued by the host. There is a need for improved memory management to improve performance of reliable memory.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIG. 10 illustrates, by way of example and not limitation, a flow diagram representative of the method performed in FIG. 7.

DETAILED DESCRIPTION

Figure 1:
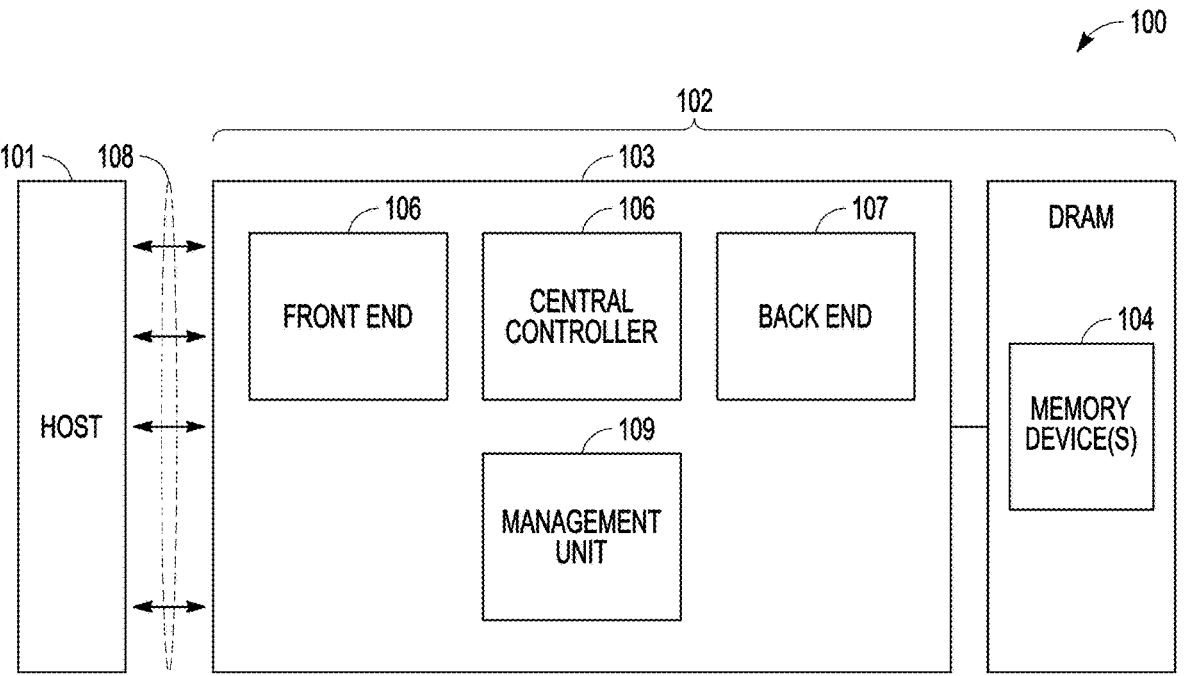
FIG. 1 illustrates, by way of example and not limitation, a system that includes a host connected to a memory system.

Parity bits may be maintained in a memory device and maintained by a memory controller to support a high level of RAS in memory systems such as recent generations of low power (LP) memory like LP5 systems. Because parity for new data is calculated using the existing data, the existing data is read as part of the process for writing new data. For some embodiments, extra metadata (e.g., CRC) may also be maintained in the memory and managed by the controller. Maintaining this extra data causes a write ampli-fication where each host write results in up to 4 times the back-end reads/writes (e.g., (1) read data, (2) read parity, (3) write data, (4) write parity) or up to 6 times the back-end reads/writes (e.g., (1) read data, (2) read parity, (3) read CRC, (4) write data, (5) write parity, (6) write CRC). This 4× or 6× write amplification degrades performance and increases power consumption.

Various embodiments provide a system configured to buffer at least some of the data used to support RAS. The buffer, or set of buffers, may be referred to as a hybrid buffer as the system is capable of buffering both user data and parity data. The buffer, or set of buffers, may be referred to as a distributed buffer as the buffer is distributed among memory channels to temporarily store user data and/or parity data. The distributed hybrid buffer may be a set of buffers distributed among memory channels and capable of being used to temporarily store both user data and parity data. Even though buffer operation may be discussed in terms of being a single logical buffer, the actual physical implementation of the buffer may be distributed per channel in some ratio (e.g., anywhere from a single monolithic buffer for all channels to a single buffer per channel). Adding write buffering distributed among the memory channels allows frequently accessed data to remain in the buffer and thereby reduce the write amplification while maintaining the same level of RAS.

A flag may be added to the protocol that allows a RAID controller to specify whether to buffer a user data or parity block in each channel. This buffering scheme allows subsequent reads and writes to the data and/or parity to be serviced directly from the buffer thereby reducing write amplification.

Compared to an unbuffered implementation where a RAID controller directly accesses memory channels, the present subject matter increases performance (bandwidth, latency) by allowing data updates to happen in the buffer and data accesses to be serviced from the buffer instead of being serviced via back-end accesses to the memory device(s). Buffer accesses may be about 10 times faster than back-end memory accesses. Also, buffering some data and/or parity reduces the number of higher-latency back-end accesses to the memory device(s) and decreases the power consumption of the memory system.

The RAID controller may add an extra bit without requiring any extra state. Thus, for example, back-end bandwidth may be saved by caching the parity updates to allow more time for the host to do what it needs to do. For example, modeling has indicated that this buffering scheme may improve bandwidth between 6% to 171% and may reduce memory power consumption between 10% and 32%.

The present subject matter may be implemented with any memory that uses parity for RAID-like schemes and/or uses metadata such as CRC to support RAS. Furthermore, by way of example and not limitation, the present subject matter is capable of being implemented in compute express link (CXL) systems. Emerging data-rich and compute-intensive processing applications such as artificial intelligence, machine learning and analytics have placed significant and competing demands on memory systems such as memory systems used in data centers. These competing demands include power, performance and reliability. Reduced energy expense significantly improves the operational cost over the lifespan of a data center. It is therefore desirable to optimize the energy consumption without compromising performance.

CXL is an industry open standard interface for high-speed communications and has been developed to support these emerging data-rich and compute-intensive applications. CXL memory includes a Dynamic Capacity Device (DCD) (see CXL 3.0 spec 9.13.3). A benefit of CXL and DCD is that memory can be added through CXL ports, and that the memory may be configured as pooled memory where portions of the pooled memory may be allocated to and released by hosts. Pooled memory improves memory utilization as memory may be shared among hosts. Additionally, simpler memory access instructions may be used similar to host-attached memory. Scalability is another benefit. The CXL interface can allow systems to significantly improve performance while reducing total cost of ownership. CXL enables efficient communication between processors, memory devices, and accelerators which offload some tasks from the central processing unit (CPU). CXL maintains memory coherency between the CPU memory space (e.g., the host memory or caches maintained by the host) and memory on attached devices or accelerators. Some benefits include resource sharing and lower overall system costs. For example, CXL may enable servers to be composed with higher memory capacity and low latency to meet application needs, as memory capacity may be scaled, integrated and expanded for application workloads.

DCD allows for both shared and pooled memory. Shared memory is accessible by all processors in a system such that each processor may read from and write to the shared memory. Shared memory makes it easy to share and communicate data because different processors may share data by accessing the same block of memory rather than performing complicated data transfers. Since the shared memory can be accessed as needed without data transfer communication over a network, the shared memory reduces latency and power consumption. Pooled memory is an efficient use of the memory. A memory controller, which may be referred to herein as processing circuitry, manages the memory by dynamically allocating or deallocating memory for use by specific processor(s). Each processor (e.g., host) may be allocated its own dedicated memory, which guarantees access to the memory, avoids interference from other processors, and improves system security from malicious code because of the isolated pools of memory.

FIG. 1 illustrates, by way of example and not limitation, a system 100 that includes a host 101 connected to a memory system 102. The memory system may include a memory controller 103 and memory device(s) 104. An example of memory device(s) 104 is dynamic random access memory (DRAM) which may be operated according to a protocol such as an LP5 system. The memory controller 103 may be integrated with or discrete from the memory device(s) 104. The host 101 may communicate with the front end 105 of the memory controller 103 using input/output (I/O) lanes 108. The memory controller 103 is configured to control memory, which may be provided in one or more memory devices 104. The memory controller 103 may include a management unit 109 configured to initialize, configure, and/or monitor characteristics of the memory controller. The central controller portion 106 may control, in response to receiving a request from the host 101, performance of a memory operation. The memory operation may include memory access requests such as read operations to read data from the memory device(s) 104 or write operations to write data to memory device(s) 104.

Figure 2:
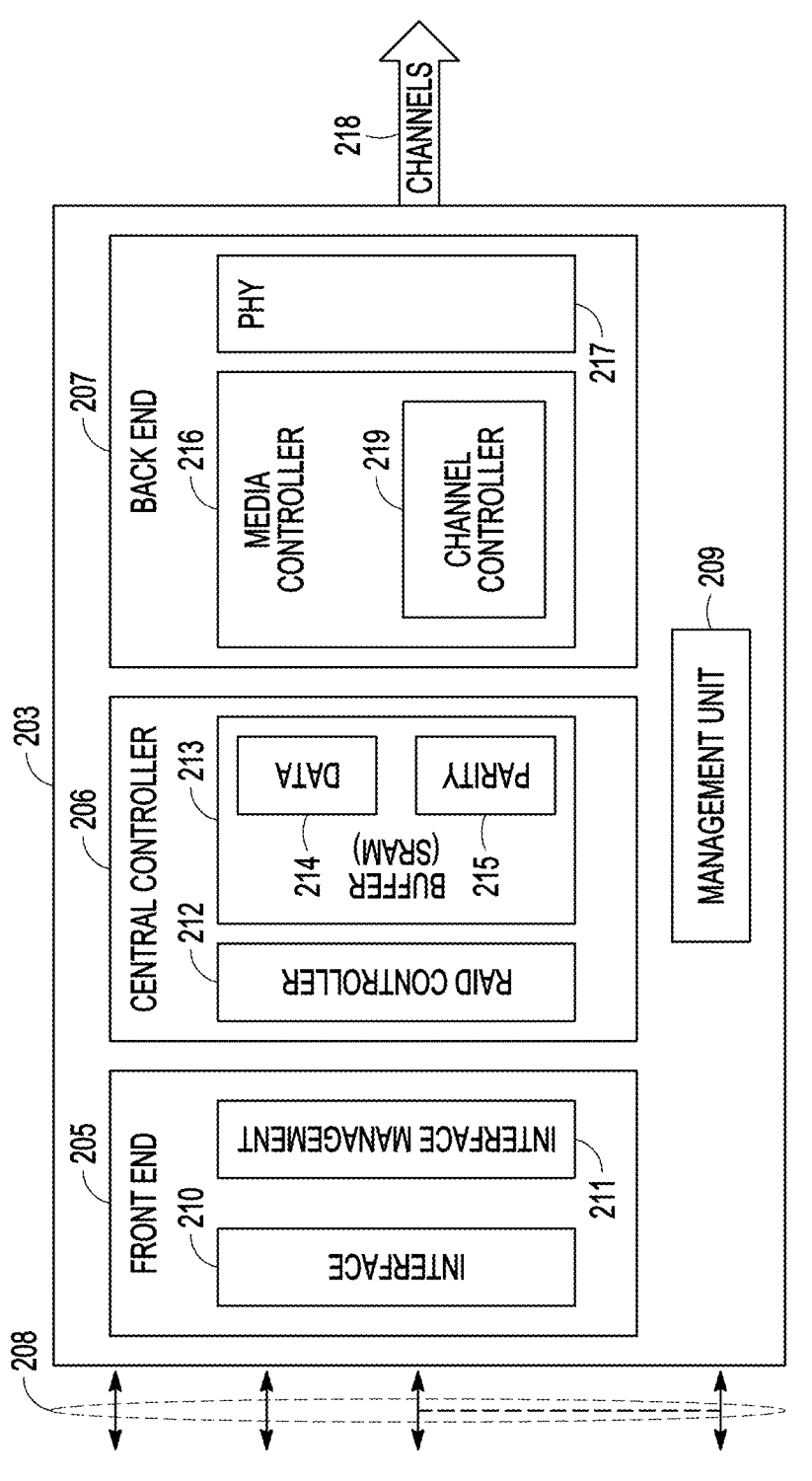
FIG. 2 illustrates, by way of example and not limitation, a memory controller configured to implement distributed hybrid buffer operations.

FIG. 2 illustrates, by way of example and not limitation, a memory controller 203 configured to implement distributed hybrid buffer operations. The memory controller 203 may be an example of the memory controller 103 in FIG. 1, and may similarly include a front end 205, a central controller 206, a back end 207 and a management unit 209. The front end 205 may include an interface 210 and interface management circuitry 211 to couple the memory controller 203 to the host through input/output (I/O) lanes 208. There can be any quantity of I/O lanes, such as eight, sixteen, or other numbers. The I/O lanes 208 may be configured as a single port. By way of example and not limitation, the interface 210 between the memory controller 203 and the host may be a PCIe physical and electrical interface operated according to a CXL protocol. As illustrated in FIG. 2, the central controller 206 may include a RAID controller 212 and buffer(s) 213. The buffer(s) may be used to buffer parity 214 and/or data 215. The buffer(s) 213 are unlike a typical cache used by a central processing unit (CPU) because there is asymmetry in the information stored. For example, the buffering of data blocks and parity blocks may be separately controlled, and the buffering may be configured to not cache reads but rather focus on write commands implemented with RAS management to reduce the write amplifications.

The central controller 206 may perform error detection operations such as cyclic redundancy check (CRC) and/or error correction operations such as error correction code (ECC) on data received from the host or from the memory device(s). CRC may determine a check value using the data to be protected and can detect accidental changes to data by comparing a previously stored check value for the data to a calculated check value for the data. ECC adds redundant bits to the data and examines the added bits to check for any errors in the data and correct some of the detected errors. RAID may provide data mirroring, data parity and/or striping. The RAID controller 212 receives the host reads/writes and delivers the data as well as keeps parity information consistent and may initiate a repair process to recover data subject to an error.

The back end 207 of the memory controller 203 may include a media controller 216 and a physical (PHY) layer 217 that couples the memory controller 203 to the memory device(s). The PHY layer 217 may be used to transfer data over a physical data transmission medium that may include channels 218. More than one channel may be used to increase the rate of data transfer. The back end 207 may exchange (e.g., transmit or receive) data over the channels 218 with the memory device(s) and exchange error detection information, RAID information, and/or error correction information with the memory device(s). The media controller 216 may include a channel controller 219 used to control communication over the channels. The memory controller 203 may include a management unit 209 configured to initialize, configure, and/or monitor characteristics of the memory controller 203.

Figure 3:
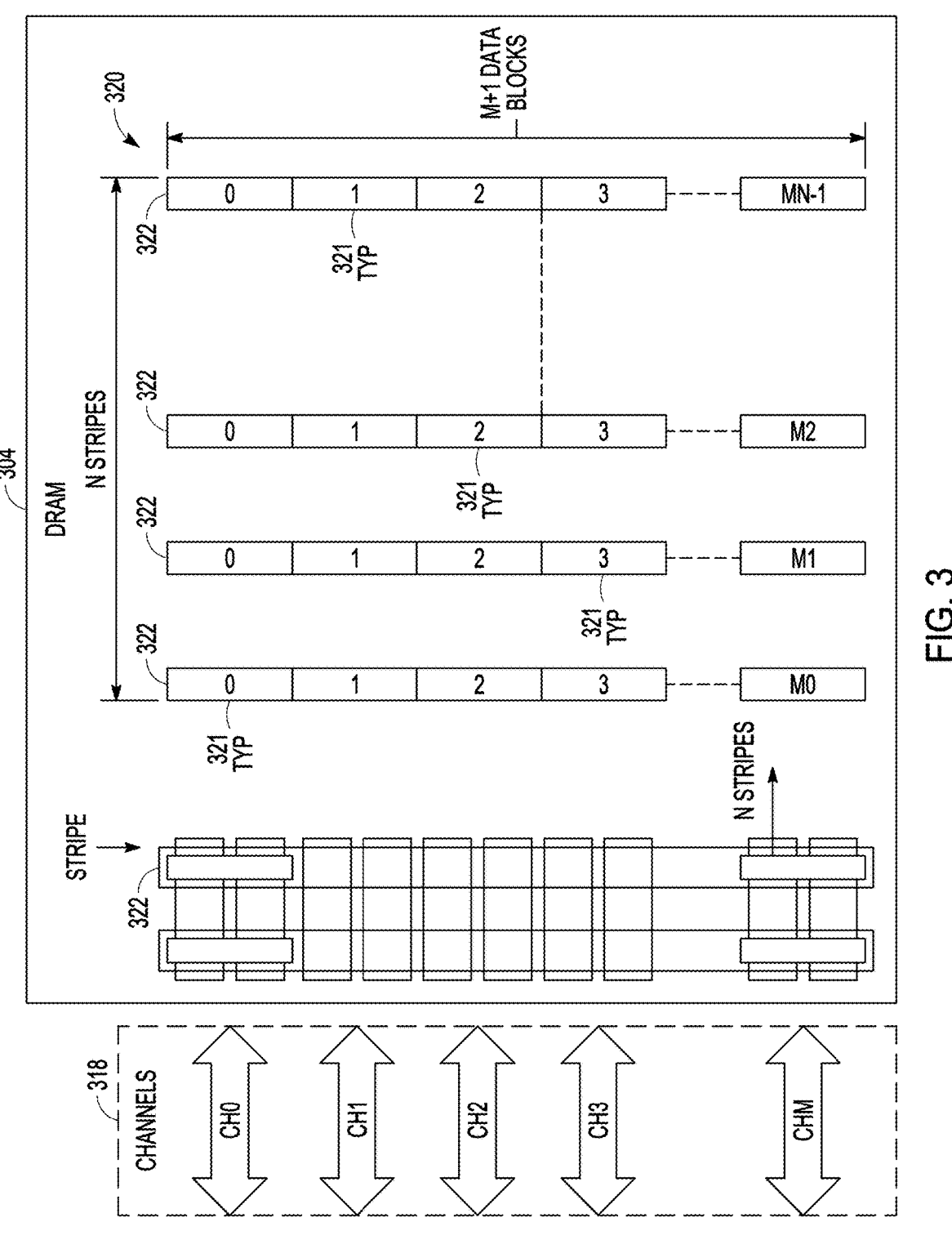
FIG. 3 illustrates, by way of example and not limitation, stripes of memory blocks within the memory.

FIG. 3 illustrates, by way of example and not limitation, a multichannel memory block 320 within the memory. The multichannel memory block 320 may include data blocks 321. The multichannel memory block 320 may be configured with multiple channels 318, illustrated as channel 0 through channel M. DRAM channels 0-N may store both parity and data blocks. The locations of the parity blocks are not limited to a particular physical channel. Rather, the parity and data may be spread throughout the channels with some deterministic mapping. Data access may occur concurrently over different channels to the DRAM 304, which may be one or more memory devices. The memory block 320 also is configured with multiple stripes 322, where each stripe includes block(s) for each channel. The stripe data and its corresponding parity may not live in the same channel in order to maintain the RAS guarantee. For example, channel 0 (CH0) may correspond to the "0 data block" in each of the N stripes (e.g., 1_0, 2_0, 3_0 . . . . N_0, where the first number represents the stripe and the second represents the data block). For a given stripe, an XOR function may be performed on the data blocks for each of the channels CH0-CH15, and the XOR result may be written.

Figure 4:
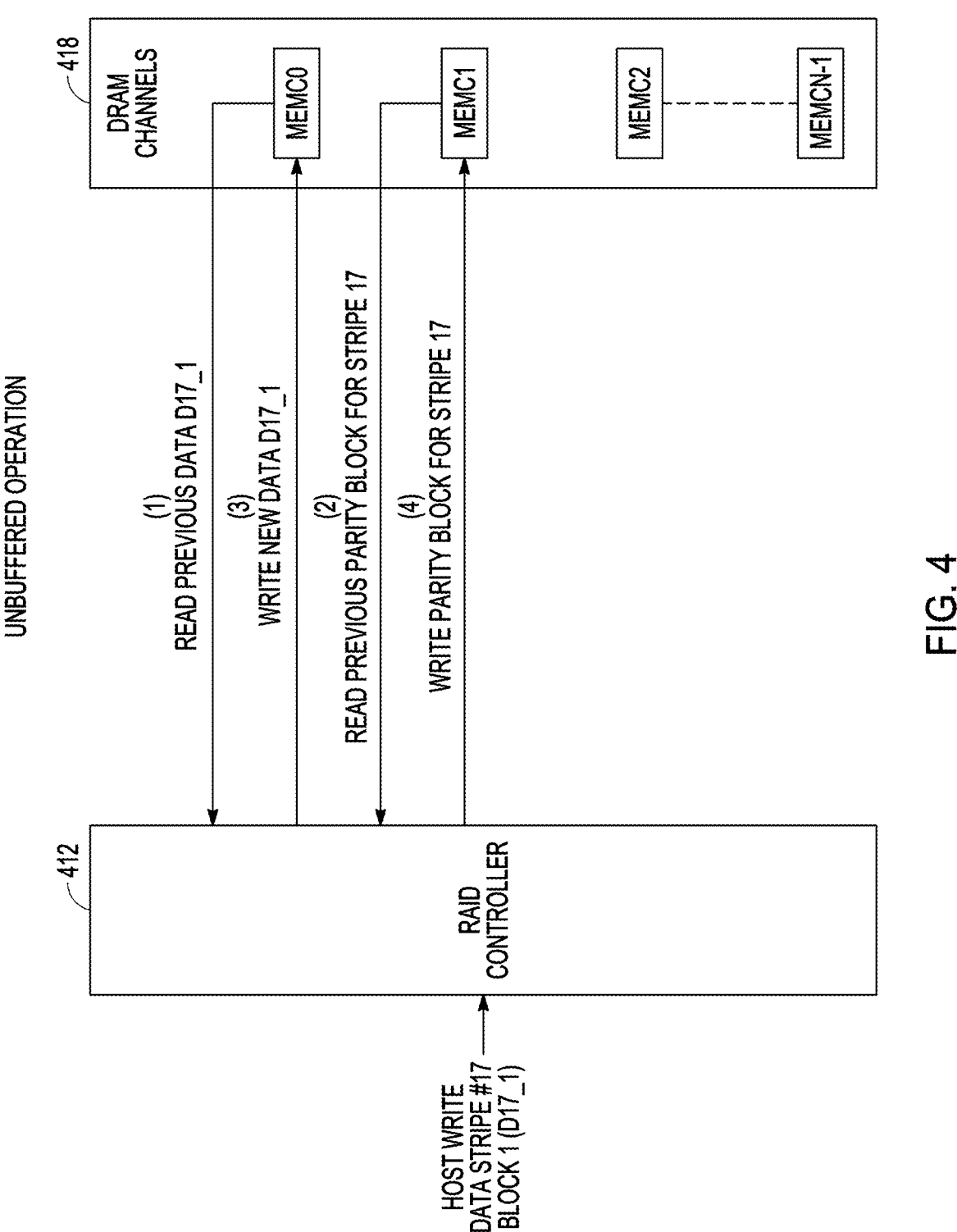
FIG. 4 illustrates, by way of example and not limitation, unbuffered operation of a memory system.

FIG. 4 illustrates, by way of example and not limitation, unbuffered operation of a memory system. The illustrated memory system includes a RAID controller 412 and DRAM channels 418 over which the memory controller communicates to the memory device(s). The DRAM channels 418 may include N memory channels, identified as a memory channel 0 (MEMC0), a memory channel 1 (MEMC1), a memory channel 2 (MEMC2) and the nth memory channel (MEMCN-1). Parity and data for a given RAID stripe are not stored on the same channel to enhance data integrity and performance. For example, distributing parity and data on different channels ensures that a single failure in one channel does not result in the loss of both the data and its parity and also improves data access and write times by balancing the load across the channels.

The illustrated unbuffered operation shows the 4× write amplification in the back end read/writes. More particularly, a host write issued to the memory system with parity turns into two reads and two writes. As illustrated, the host writes to a data memory location in stripe 17 block 1 (D17_1). In response, the RAID controller 412 (1) performs a back-end read of the previously stored data (D17_1) (data at block 1 in RAID stripe 17) using a first memory channel (e.g., MEMC0) and (2) performs a back-end read of the previous parity block for stripe 17 (P17) using a second memory channel (e.g., MEMC1). The RAID controller 412 XORs new data for D17_1 with old data for D17_1 to compute the parity update, (3) writes new data (D17_1) back to the memory using the first memory channel (e.g., MEMC0) and (4) writes new parity block for stripe 17 using the second memory channel (e.g., MEMC1). If the memory uses CRC, then CRC read and CRC write are two additional back-end accesses which results in a 6× amplification of the host write. Even if the same data is re-written or re-read soon after, four back-end transactions must occur.

Figure 5:
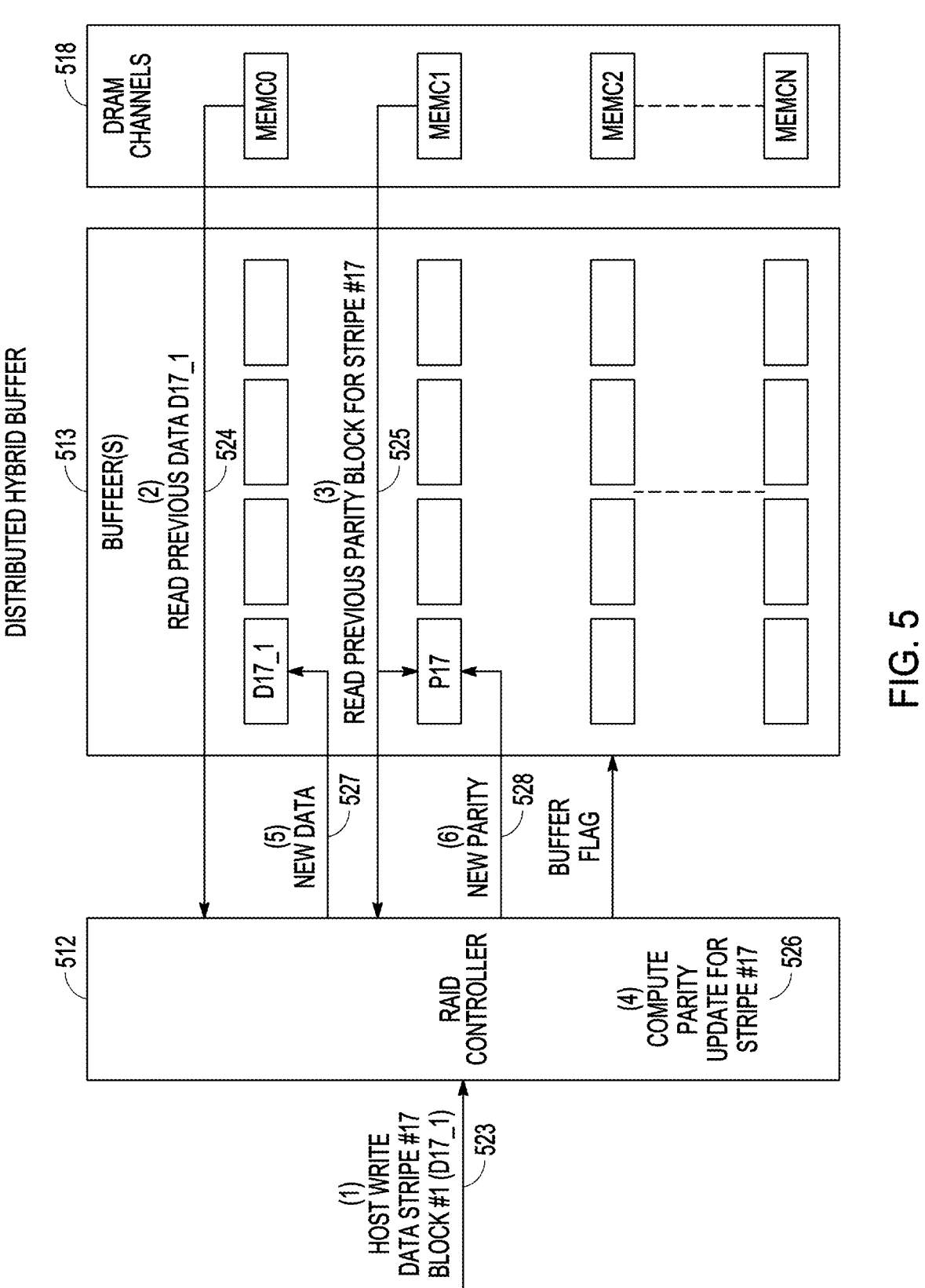
FIG. 5 illustrates, by way of example and not limitation, an example of operations that may be performed using a distributed hybrid buffer in the memory system.

FIG. 5 illustrates, by way of example and not limitation, an example of operations that may be performed using a distributed hybrid buffer 513 in the memory system. The buffer 513 is configurable to cache user data, parity data, or both user data and parity data as was illustrated at 214 and 215 in FIG. 2. The buffer 513 may be configured to be distributed among the different DRAM channels 518. The distributed hybrid buffer 513 helps to reduce write amplification by not re-reading previously accessed parity blocks and not writing them back immediately. For simplicity, the buffer 513 is illustrated with a buffer interposed for each channel, such that each channel gets its own buffer. However, more than one channel may share a buffer, or a channel may include more than one buffer.

The RAID controller 512 may be configured to determine that a particular write command should have its corresponding data and/or parity buffered, and to selectively send the buffer(s) 513 a buffer flag ("BUFFER FLAG") when it determines that the data and/or parity should be buffered. The memory controller may use a policy to determine what information should be buffered. The policy need not be hardcoded and may exist outside of the buffer. The policy may be in firmware and may be updated during bootup of the memory controller. Some applications, such as artificial intelligence or machine learning, may make multiple passes through the data writing multiple values to the same array or may otherwise exhibit a temporal locality or spatial locality in the accessed memory locations. Applications and address mapping may be configured (e.g., via optimization routines) to keep memory access sequences within the same stripe(s) to enhance the benefits of buffering the parity. A policy or policies may be created to exploit the accesses to the same memory location or locations within the same stripe.

In the illustrated example, the RAID controller 512 receives a host write 523 from a host to D17_1 in a first step. In a second step in response, the RAID controller 512 may use memory channel 0 (MEMC0) to read previous data D17_1 524 stored in the first data block of the 17th stripe in the DRAM. The read may bypass the buffer as there is no need to store old data that is going to be replaced. In a third step, the RAID controller 512 may use memory channel 1 (MEMC1) to read a parity block P17 for the 17th stripe as well as buffer parity block P17 525 in a buffer location within the buffer 513. In a fourth step, the memory controller may determine or compute the new parity 526 accounting for the new data to be written D17_1. For example, the RAID controller 512 may compute the parity update between the new and old data. The parity update may represent an XOR function on the data blocks in stripe 17. In a fifth step, the RAID controller 512 may write a new value for D17_1 to a channel 0 buffer location 527. In a sixth step, the RAID controller 512 may write a new value of P17 to a channel 1 buffer location 528. Thus, after the host write to D17_1 completes, the buffer stores the data D17_1 and parity P17 associated with the write so that further reads or writes to D17_1 or P17 can be serviced directly from the buffer.

CRC may be deemed to be not necessary for the SRAM buffer because SRAM designs may already address error detection and correction (e.g., the SRAM can comprise an ECC memory). As such, it may be reasonable to assume that the SRAM data is clean and does not need to be rechecked. However, CRC data may be included in the buffer if one cannot assume the SRAM data is clean. Thus, if the data and parity are stored in the SRAM buffer, then a CRC read or write may be avoided with a write command which saves backend accesses for CRC read/write for data that is within the buffer. If the host writes to a different data block in the same stripe, the cached parity block may be used which still saves two back-end requests (e.g., avoids a parity read and a parity write). By way of example, SRAM buffer accesses may be about ten times as fast as the back-end DRAM so there is significant savings every time a backend access can be replaced with an access to the buffer. Additionally, back-end DRAM uses more power and has larger power swings compared to SRAM which has a predictable steady state power usage.

Figure 6:
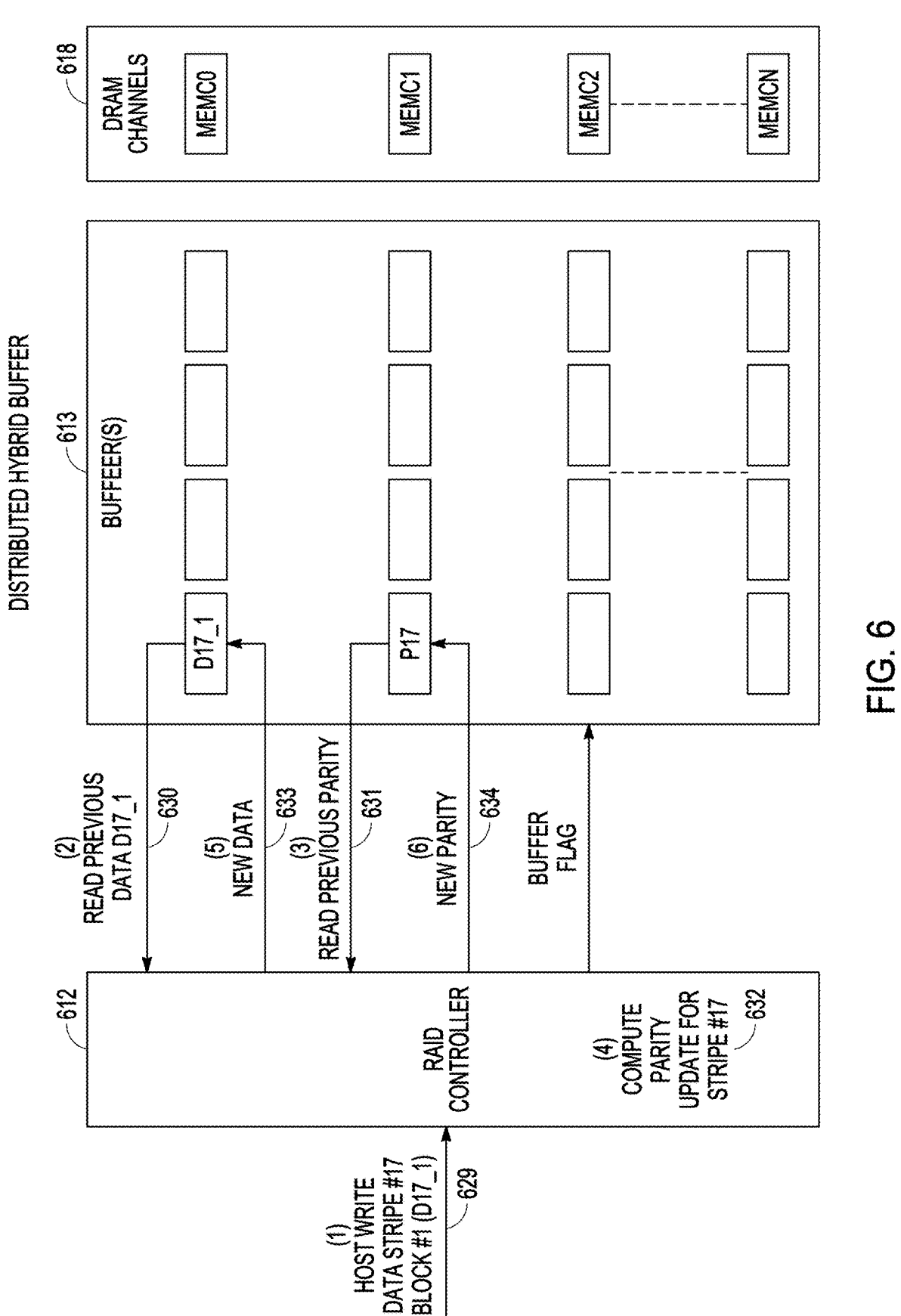
FIG. 6 illustrates, by way of example and not limitation, an example of further operations that may be performed using the distributed hybrid buffer in the memory system.

FIG. 6 illustrates, by way of example and not limitation, an example of operations performed using the distributed hybrid buffer in the memory system when another write command to the same memory location is received. In the illustrated example, both the data and parity are being buffered. In a first step in the illustrated example, the buffer 613 is storing data D17_1 and parity P17, and the RAID controller 612 receives from a host a write command 629 to the RAID controller 612 to write data to the data memory location in stripe 17 block 1 (D17_1). As both of the data (D17_1) and parity (P17) are in the buffer, the memory controller is capable of performing the write command without any back-end access to the memory device(s) via the DRAM channels 618. In a second step in response to the received Write D17_1 command, the RAID controller 612 may perform a cached read 630 of the previously stored data (D17_1) within the buffer(s) 613. In a third step, the RAID controller 612 may perform a cached read 631 of the previous parity block for stripe 17 (P17) within the buffer(s) 613. In a fourth step, the RAID controller 612 may compute a parity update 632 (e.g., XORs new data for D17_1 with old data for D17_1). In a fifth step, the RAID controller 612 may write new data (D17_1) 633 back to the buffer(s) 613 and in a sixth step may write a new parity block for stripe 17 634 back to the buffer(s) 613. Accesses to the SRAM buffer are faster and more power efficient than accesses to the DRAM device(s). Therefore, the memory system is capable of performing the requested write in a power efficient and fast manner using the distributed hybrid buffer.

Figure 7:
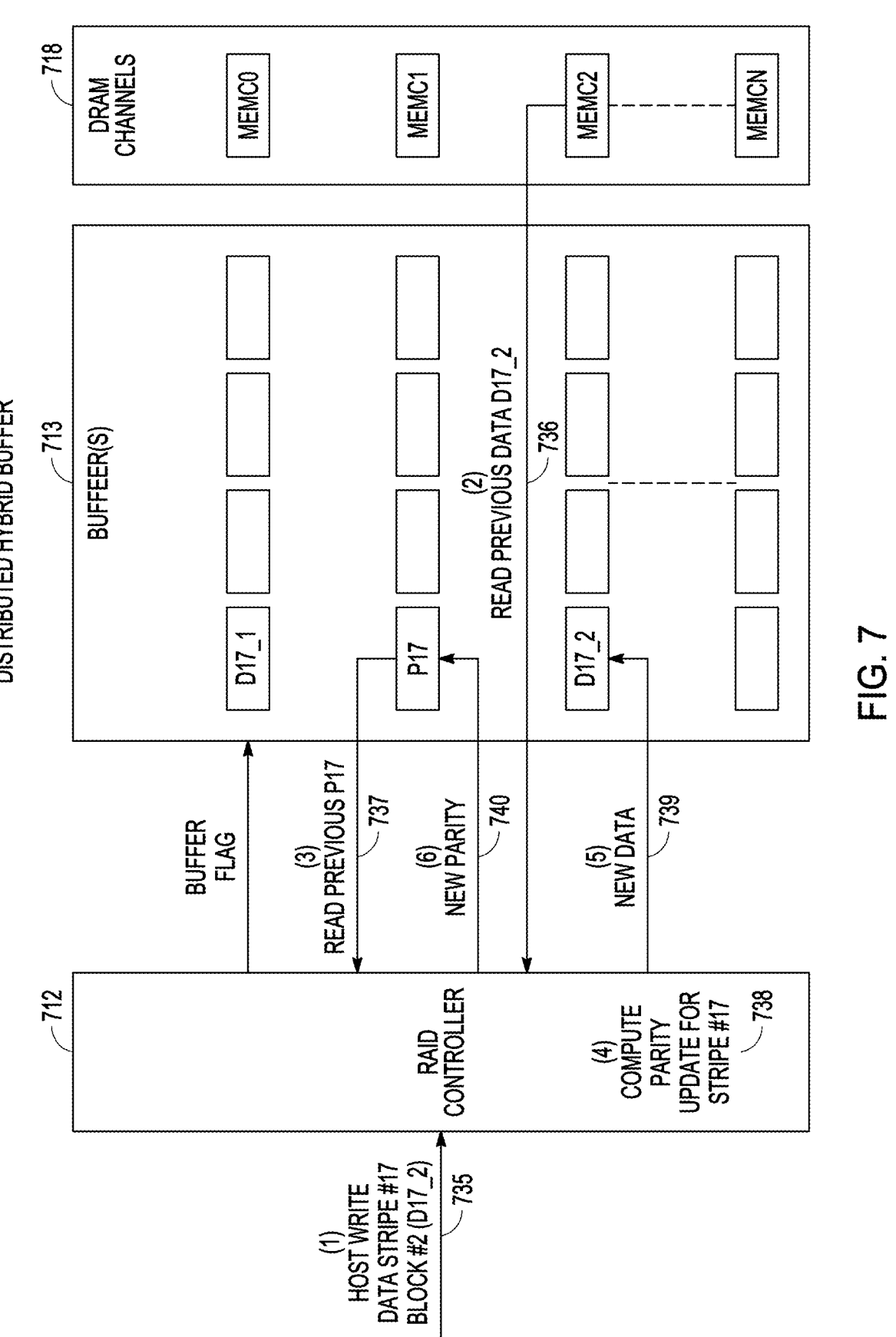
FIG. 7 illustrates, by way of example and not limitation, an example of operations performed using the distributed hybrid buffer in the memory system when another write command to a different data block in the same stripe is received.

FIG. 7 illustrates, by way of example and not limitation, an example of operations performed using the distributed hybrid buffer in the memory system when another write command to a different data block in the same stripe is received. In the illustrated example, the buffer 713 is storing data D17_1 and parity P17. In a first step, the RAID controller 712 may receive from a host a write command 735 to the RAID controller 712 to write data to the data memory location in stripe 17 block 2 (D17_2). The RAID controller 712 may determine that the data and/or parity should be buffered and send a corresponding BUFFER FLAG. In the illustrated example, the RAID controller 712 determines that both data and parity are to be buffered. Thus, the requested write is in the same stripe, but a different data block in the stripe. In a second step, as the data (D17_2) is not in the buffer 713, the RAID controller 712 may use a third memory channel (e.g., MEMC2) within the DRAM channels 718 to perform a back end read 736 of previous data D17_2. However, as the parity (P17) is in the buffer 713, the RAID controller 712 may, as illustrated in a third step, read the previous parity (P17) 737 from the SRAM buffer 713 rather than having to perform a back end read to the memory device(s). In fourth step, the memory controller may compute the parity update for stripe #17 738, may write the new data D17_2 739 to another location in the buffer as illustrated in a fifth step, and write the new or updated parity 740 to the buffer 713 as illustrated in a sixth step. Thus, the memory controller is capable of performing the write command to a new data block without any back-end accesses for reading/writing parity.

Figure 8:
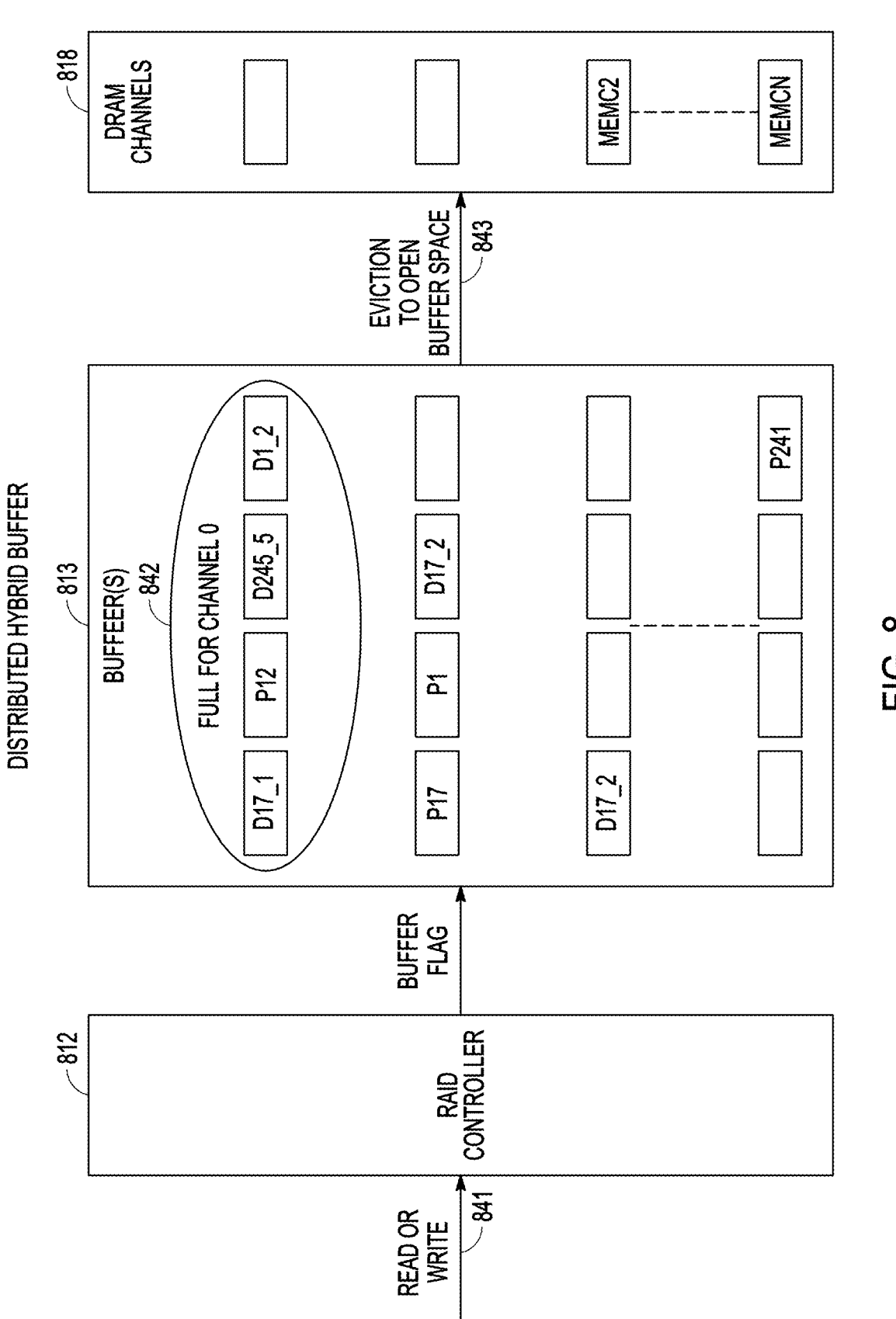
FIG. 8 illustrates, by way of example and not limitation, an eviction process performed to write buffered data or buffered parity back to the memory and clear buffer space.

FIG. 8 illustrates, by way of example and not limitation, an eviction process performed to write buffered data or buffered parity through the DRAM memory channels 818 back to the memory and clear buffer space. The buffer(s) may become full such that a new read or new write may trigger an eviction. A read or write 841 may be received by the RAID controller 812. The RAID controller 812 may determine that the read or write should include writes to the buffer(s) 813 and send a corresponding BUFFER FLAG, but the buffer may be full (e.g., buffer locations 842 associated with channel 0 (MEMC0) may be full). An eviction procedure 843 may be performed according to an eviction policy in preparation to write at least one of new data or new parity to the buffer. The eviction procedure may include writing buffered information from at least one of the buffer locations to the memory and clearing the buffered information from the at least one of the buffer locations. For example, at least one of the buffer locations for channel 0 may be written back to the DRAM memory devices using channel 0, and then channel 0 may be used to buffer data associated with the newly received read or write 841. Victim(s) may be chosen from the buffered data and/or the buffered parity depending on the policy. The eviction policy may be changed at boot up of the memory controller. By way of example and not limitation, the eviction policy may favor keeping buffered parity in the buffer over buffered data. For example, it may be determined that it is more likely that the buffered parity will be used than a particular data block within a stripe. The eviction policy may provide a weighted eviction for maintaining a range of percentages of parity blocks and a range of percentages of date blocks. By way of example and not limitation, the policy may require that 60 to 80 percent of the available space in the buffer is used to store parity and 20 to 40 percent of the available space in the buffer is used to store data. By way of a nonlimiting example, the system may try to maintain 75% parity blocks and 25% user blocks based on some heuristic. The weighted eviction policy may be used to bias another policy such as LRU. The eviction may be based on a least recently used (LRU) buffer location or based on received temperature metadata indicative of a prediction of memory location use. Other nonlimiting examples of an eviction policy may be a not most recently used (NMRU) buffer location which may provide a faster approximation of LRU, a random eviction such as may be used if the system does not have space to maintain line usage metadata.

Figure 9:
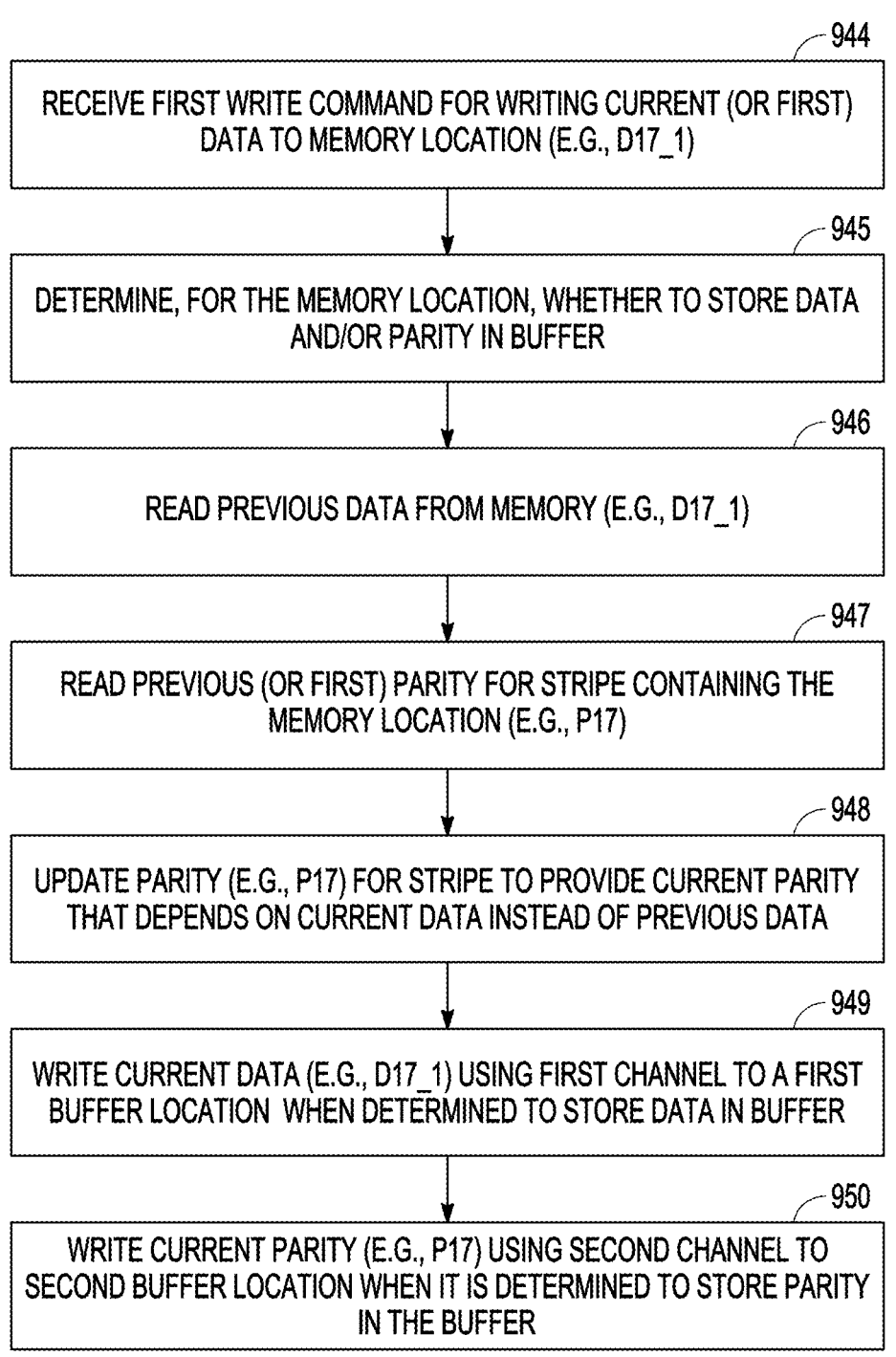
FIG. 9 illustrates, by way of example and not limitation, a flow diagram representative of the operations performed in FIG. 5.

FIG. 9 illustrates, by way of example and not limitation, a flow diagram representative of operations performed in FIG. 5. The operations may be implemented using a memory and a memory controller configured to communicate with the memory over two or more memory channels where the memory controller includes a buffer having a plurality of buffer locations distributed across the two or more memory channels. At 944, the memory controller may receive a first write command (e.g., Write D17_1) for writing current data to a memory location within a memory that includes stripes. Each of the stripes includes memory blocks and a parity block. The memory location corresponds to one of the memory blocks in one of the of stripes. At 945, it is determined whether to store data for the memory location in the buffer and/or parity for a stripe containing the memory location in the buffer. At 946, previous data may be read at the memory location (e.g., Read D17_1). A previous parity which depends on the previous data may be read (e.g., Read Parity P17) from the parity block in the stripe containing the memory location, as illustrated at 947. As illustrated at 948, parity for the stripe containing the memory location may be updated to provide a current parity (e.g., P17) that depends on the current data. At 949, the current data may be written using a first memory channel to a first buffer location in the buffer (e.g., Cache D17_1) when it is determined to store the data in the buffer. At 950, the current parity may be written using a second memory channel into a second buffer location in the buffer when it is determined to store the parity in the buffer.

FIG. 10 illustrates, by way of example and not limitation, a flow diagram representative of operations performed in FIG. 7. The operations may be implemented using the memory and the memory controller used in FIGS. 5 and 10, and the memory location is a first memory location and the current parity in the second buffer location is a first parity. The operations may include receiving at the memory controller a second write command 1051 for writing second current data to a second memory location within the memory (e.g., Write D17_2). The second memory location may correspond to a second one of the memory blocks, and the stripe containing the first memory location also includes the second memory location. The operations may include determining, for the second memory location, whether to store in the buffer at least one of: data for the second memory location; or parity for a stripe containing the first and second memory locations 1052. Second data may be read (e.g., Read D17_2) 1053 at the second memory location, and the first parity (e.g., P17) may be read 1054 from the second buffer location (see 950 in FIG. 9 where the second buffer location is storing the current value for the parity P17). The operations may include, as illustrated at 1055, updating parity (e.g., parity P17) for the stripe containing both the first memory location and the second memory location to provide a second parity. The operations may include writing the second data (D17_2) using a third memory channel to a third buffer location 1056, and writing the second parity (e.g., P17) using the second memory channel into the second buffer location. The second parity replaces the first parity in the second buffer location 1057.

Figure 11:
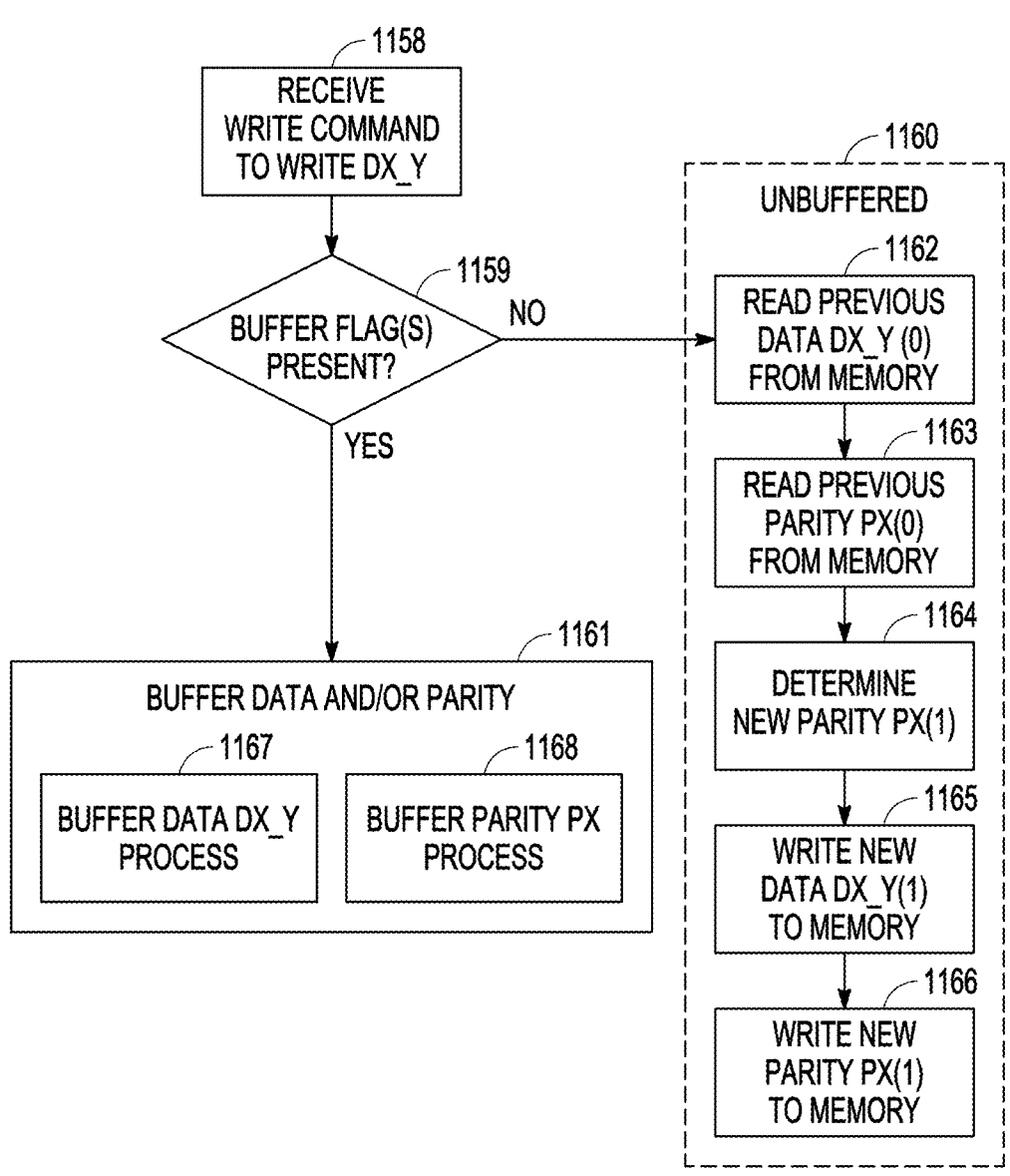
FIG. 11 illustrates, by way of example and not limitation, a flow diagram for performing buffered or unbuffered operations in response to receiving a write command.

FIG. 11 illustrates, by way of example and not limitation, a flow diagram for performing buffered or unbuffered operations in response to receiving a write command. The memory controller may receive a write command to write to a memory location (e.g., DX_Y, which represents data block Y in the stripe X) 1158. The RAID controller may determine whether to buffer data and/or parity and provide a corresponding BUFFER FLAG to the buffer. The buffer may then check to see if a BUFFER FLAG is present 1159. If the flag is not present the memory controller may perform unbuffered operations 1160. If the flag is present the memory controller may perform buffered operations 1161 to buffer data and/or parity. The unbuffered operations, as generally illustrated in FIG. 4, may include reading the previous data DX_Y from memory 1162 in the DRAM memory device(s), reading previous parity PX from memory for stripe X 1163 from memory 1162 in the DRAM memory device(s), determining new parity PX for stripe X 1164, writing new data DX_Y to the memory 1165 in the DRAM memory device(s), and writing new parity PX to the memory 1166 in the DRAM memory device(s). Thus, the illustrated unbuffered operation may include four back-end operations. If CRC information is also read and updated, the unbuffered operation may include six back-end requests. However, if flag(s) are present at 1159, the memory may implement a process to buffer the data (DX_Y) as illustrated at 1167 and FIG. 12 and/or a process to buffer parity (PX_Y) as illustrated at 1168 and FIG. 13.

Figure 12:
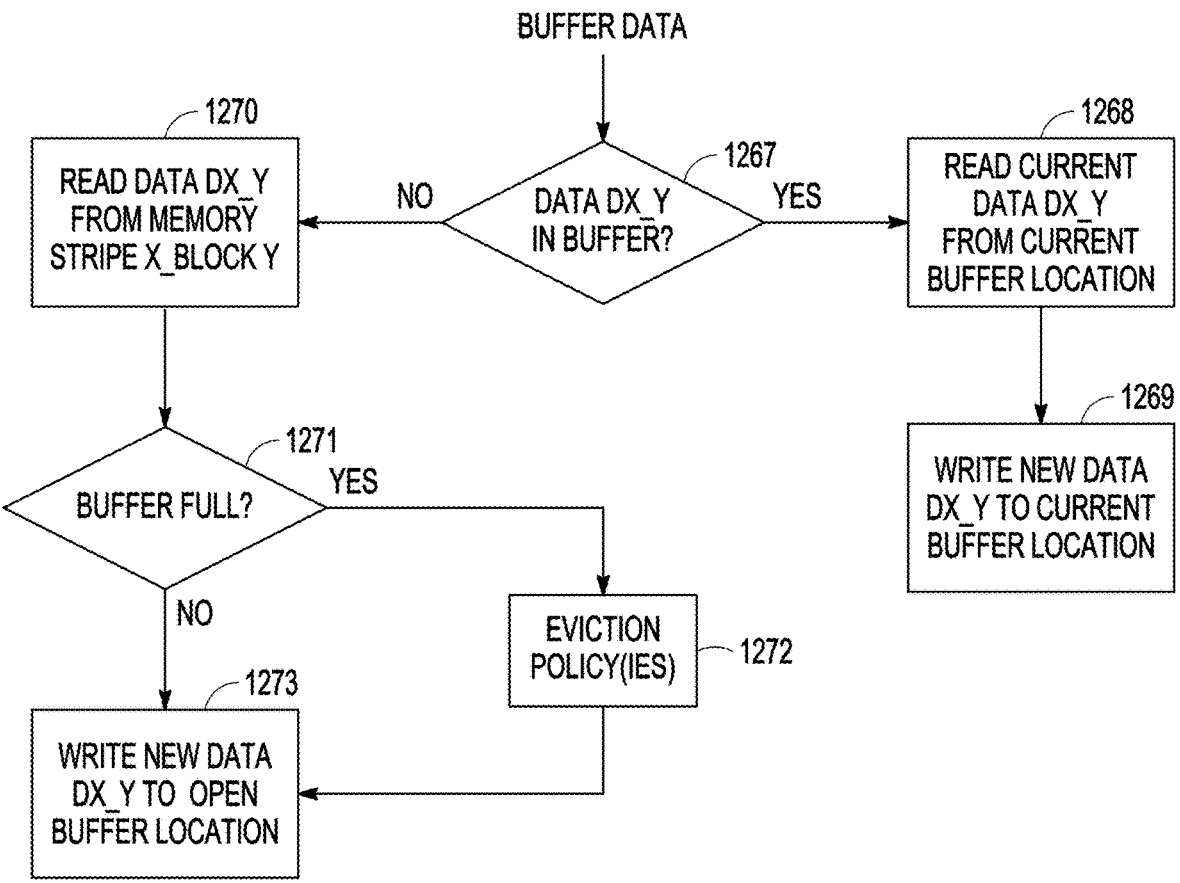
FIG. 12 illustrates, by way of example and not limitation, a flow diagram for performing buffered data operations.

FIG. 12 illustrates, by way of example and not limitation, a flow diagram for performing buffered data operations (see FIG. 11 at 1167). The operations may check to see if the data DX_Y is already in the buffer 1267. If it is in the buffer, then the operations may include reading the current data DX_Y from the current buffer location 1268 and writing new data DX_Y to the current buffer location 1269. That is, the same buffer location may be updated with the new data. However, the new data may be entered into another buffer location and identified as the current data. If at 1267 it is determined that the data DX_Y is not in the buffer, then the operations may include performing a back-end request to read data DX_Y from the memory stripe X block Y 1270. A determination may be made whether the buffer is full 1271. If the buffer is full, then the memory controller may be configured to implement an eviction process to free up space in the buffer. The eviction process may include back-end request(s) to write the buffered information (e.g., evicted data and/or parity pursuant to the eviction policy) into the DRAM and then clearing from the buffer. If the buffer is not full, then the new data DX_Y may be written to open the buffer location 1273.

Figure 13:
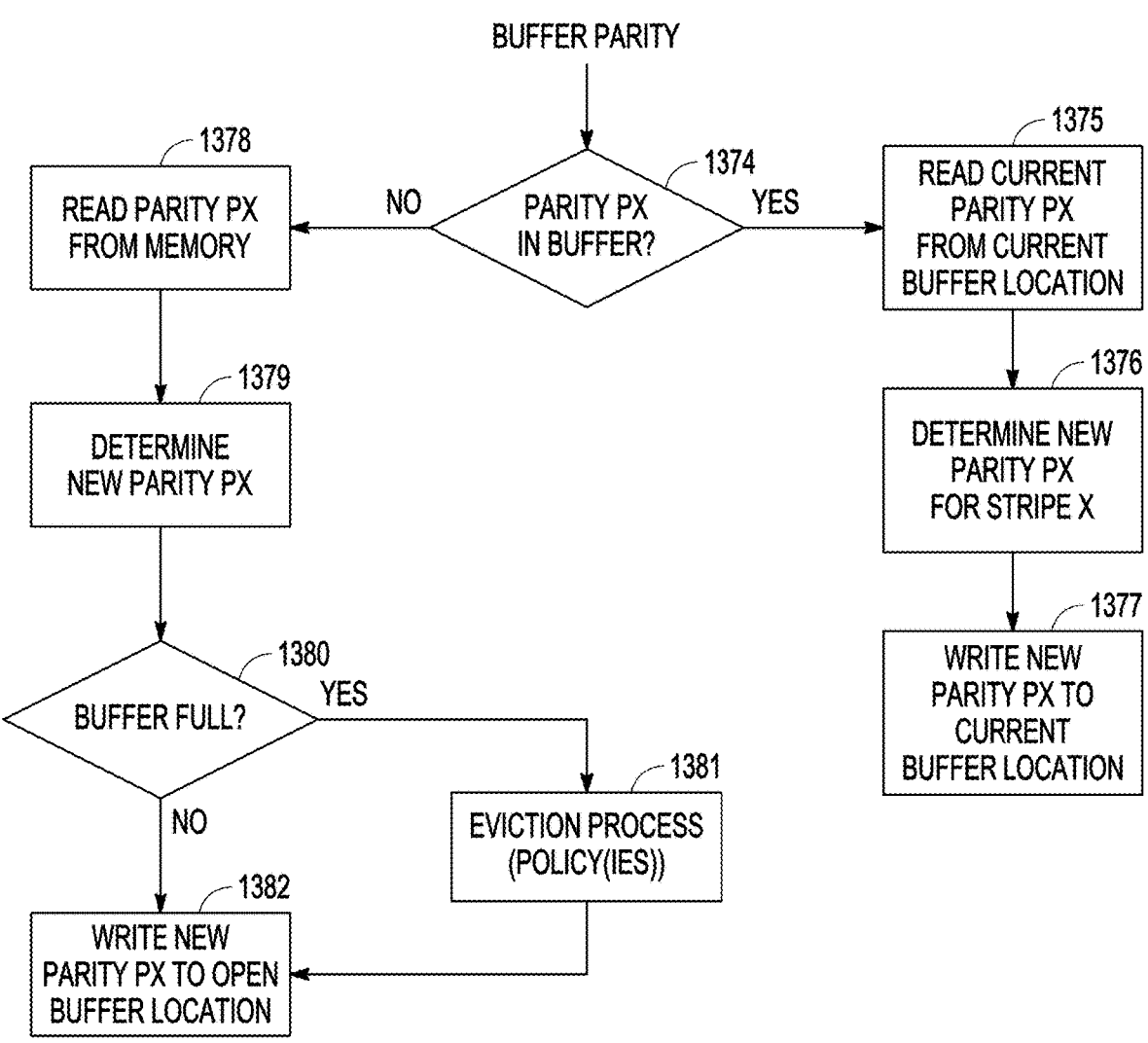
FIG. 13 illustrates, by way of example and not limitation, a flow diagram for performing buffered parity operations.

FIG. 13 illustrates, by way of example and not limitation, a flow diagram for performing buffered parity operations (see FIG. 11 at 1168). The operations may check to see if the parity PX is already in the buffer 1374. If it is in the buffer, then the operations may include reading the current parity PX from the current buffer location 1375, determining new parity PX for stripe X 1376, and writing new data PX to the current buffer location 1377. That is, the same buffer location may be updated with the new parity. However, the new parity may be entered into another buffer location and identified as the current parity. If at 1374 it is determined that the parity is not in the buffer, then the operations may include performing a back-end request to read parity PX 1378 for the memory stripe X from the memory device(s). At 1379, a new parity may be determined. A determination may be made whether the buffer is full 1380. If the buffer is full, then the memory controller may be configured to implement an eviction process to free up space in the buffer 1381. The eviction process may include back-end request(s) to write the buffered information (e.g., evicted data and/or parity pursuant to the eviction policy) into the DRAM and then clear from the buffer. If the buffer is not full, then the new parity PX may be written to open the buffer location 1382.

Figure 14:
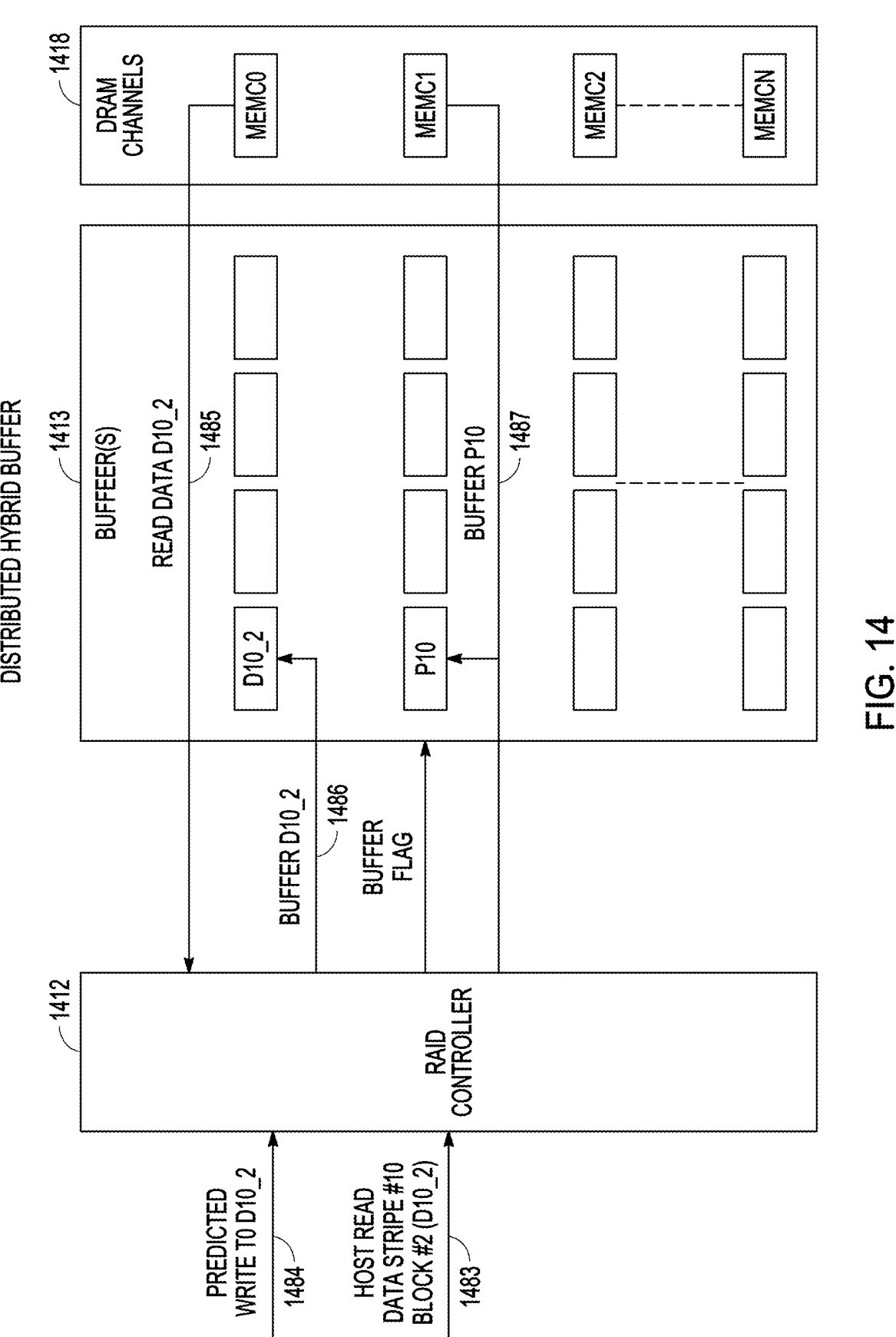
FIG. 14 illustrates, by way of example and not limitation, an example of operations that may be performed in response to a host read using a distributed hybrid buffer in the memory system.

FIG. 14 illustrates, by way of example and not limitation, an example of operations that may be performed in response to a host read using a distributed hybrid buffer in the memory system. The RAID controller 1412 may be configured to determine that a particular read command should have its corresponding data and/or parity buffered, and to send the buffer(s) 1413 a buffer flag ("BUFFER FLAG") when it determines that the data and/or parity should be buffered. For example, the RAID controller may receive a signal indicating that there is an anticipated write to the same location that is being read. The signal may come from a hot page detector, which may be a circuit (hardware, firmware, software or combinations thereof) that is configured to identify or predict a page temperature. For example, certain applications may tend to write to certain addresses shortly after they have been read, or there may be a pattern of read/writes that may be identified for a specific application or memory processes. Similarly, there may be pattern of read/writes to data blocks within the same stripe. The buffer may respond to this information by storing data on a read request. For example, if the memory controller receives a read request and the hot page detector predicts that this data will be updated soon, the read data may be buffered. Furthermore, the memory controller may fetch the parity from memory and buffer it in anticipation of updating this data soon. Effectively the read request may act as a kind of prefetch hint for later accesses.

In the illustrated example, the RAID controller 412 may send the BUFFER FLAG to the buffer(s) 1413 based on a first read command 1483 for reading current data from a second memory location within the memory and a prediction 1484 that the memory controller will receive a write command to write updated data to the second location. The memory controller may read the data D10_2 1485 and buffer the data D10_2 1486 and may further read and buffer the parity P10 1487 in anticipation of the write.

Figure 15:
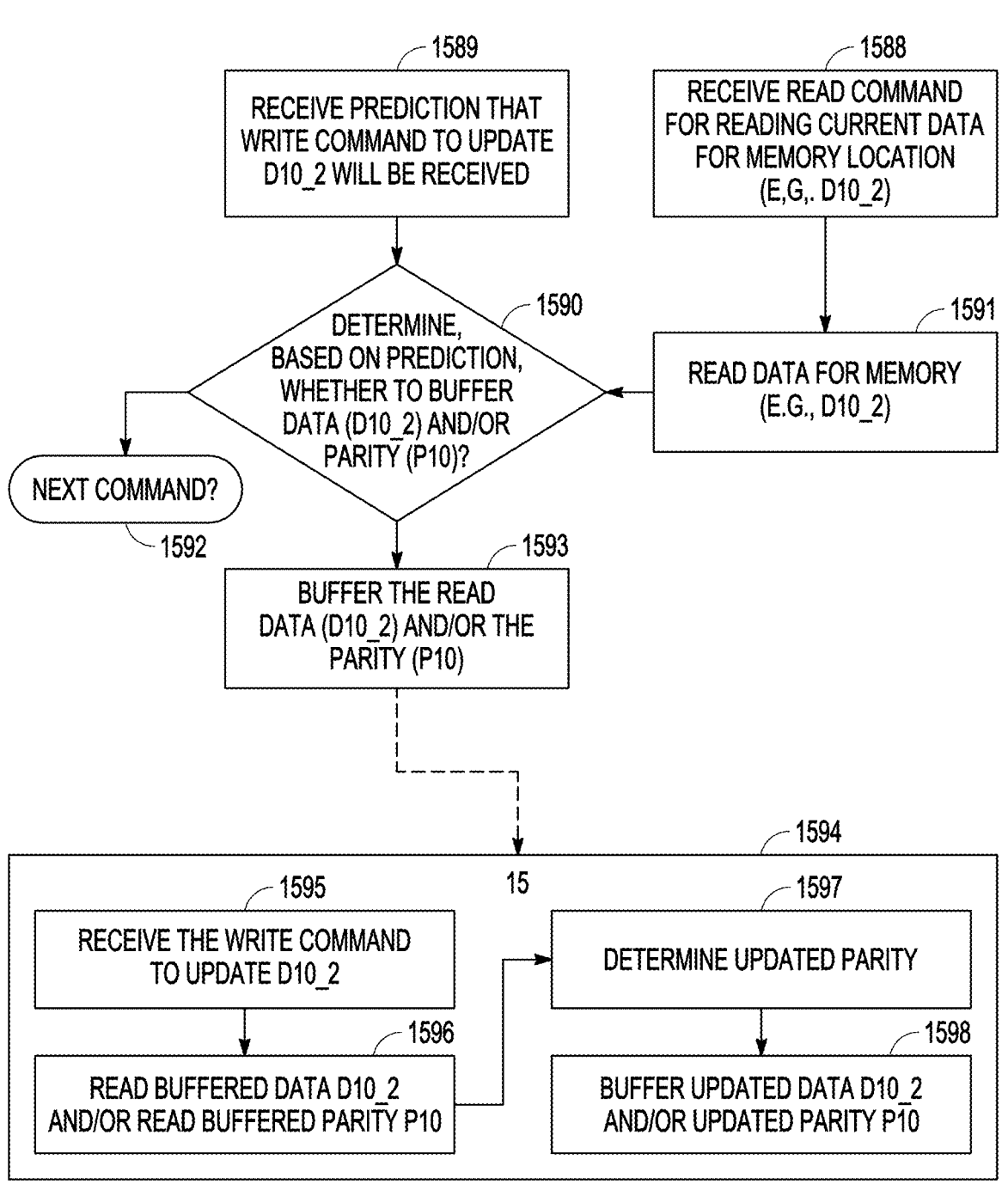
FIG. 15 illustrates, by way of example and not limitation, a flow diagram for performing buffer operations in response to a read command.

FIG. 15 illustrates, by way of example and not limitation, a flow diagram for performing buffer operations in response to a read command (see FIG. 14). The operations may include receiving at the memory controller both a first read command 1588 for reading current data from a memory location within the memory and a prediction 1589 that indicates whether the memory controller will receive a write command to write updated data to the memory location or write data to another memory location in the stripe within which the current data is being read. At 1590, a back-end request may be made to read the data from the memory (e.g., Read D10_2). At 1591, it is determined, based on the prediction, whether to buffer at least one of the read current data for the memory location or parity for a stripe containing the memory location. If it is determined that nothing is buffered, the operations may wait for the next command 1592. If it is determined that data D10_2 or parity P10 are to be buffered, then the read data D10_2 and/or the parity P10 are buffered at 1593. Then, should the predicted write command be received at 1594, the operations may include receiving the write command to update D10_2 1595, reading the buffered data D10_2 and/or read the buffered parity P10 1596, determine the updated parity P20 1597, and buffer the updated data D10_2 and/or updated parity P10 1598. Thus, back-end accesses may be saved by appropriately buffering the data and/or parity for predicted writes.

A benefit of the present subject matter is a significant reduction in write amplification by saving back-end reads/ writes (and associated CRC reads/writes) for frequently accessed data. The system may be configured to be very flexible. The data blocks and parity blocks may have the same size allowing any buffer entry to be used to store either data or parity. For example, the lifetimes of parity and data blocks are decoupled. Thus, the parity block may be stored longer within the buffer than the data block. Among other things, this allows weighted policies to be implemented where about 75% of the buffer locations are used to store parity and about 25% of the buffer locations are used to store data. Data blocks may have been evicted while parity blocks may still be buffered (or vice versa). Write amplification may be reduced by buffering and reusing the data and/or parity blocks.

Multiple policies may be implemented. An example includes setting the buffer flag only for parity transactions which may be beneficial for write-heavy loads. Buffering may be scaled for power and/or area constraints. For example, a system may use 1 buffer per channel, or may use 1 buffer per N channels. Additionally, the system is easy to implement, as the RAID controller requires no extra or complex states. Rather, a flag is added that controls whether the buffer should store the result of an executed request. The distributed hybrid buffer is flexible, as a policy may be created to buffer only some of the writes (data and/or parity) and not necessarily all of the writes. Modeling of the system shows that introducing the present subject matter results in significant performance increases and power savings over several workloads. For example, modeling has indicated that the distributed hybrid buffer may improve bandwidth between 6% to 171% and may reduce memory power consumption between 10% and 32%.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

A non-transitory machine-readable medium, also referred to as a computer-readable medium, includes instructions, which when executed by a machine, cause the machine to perform functions. The machine-readable medium may include instructions operable to configure an electronic device, such as processing circuitry, to perform methods. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, memories such as non-volatile or volatile memories, random access memories (RAMs) or read only memories (ROMs) as well as memory cards or sticks, hard disks, removable magnetic disks or cassettes, or removable optical disks (e.g., compact disks and digital video disks), and the like. The term "machine-readable medium" is intended to include at least one machine-readable medium such as two or more media which may be in the same device or in different devices, and which may be of the same type of media (such as but not limited to different nonvolatile semiconductor memory arrays) or different type of media (such as but not limited to a volatile semiconductor memory array and a nonvolatile semiconductor memory array). Furthermore, the term "machine" may include at least one processor, including one processor to implement all of the instructions, at least two processors where one processor operates on some of the instructions and other processor(s) operate on other instructions, or at least two processors where each processor is capable of operating on the same instructions. Thus, for example, distributed systems or systems with shared resources are contemplated.

The above detailed description is intended to be illustrative, and not restrictive. The scope of the disclosure should, therefore, be determined with references to the appended claims, along with the full scope of equivalents to which such claims are entitled.

What is claimed is:

1. A system, comprising:
a memory including a plurality of stripes, each of the plurality of stripes including a plurality of memory blocks and a parity block; and
a memory controller configured to communicate with the memory over two or more memory channels, the memory controller including a buffer having a plurality of buffer locations distributed across the two or more memory channels, wherein the memory controller is configured to:
receive a write command for writing current data to a memory location within the memory, wherein the memory location corresponds to one of the plurality of memory blocks in one of the plurality of stripes;
determine, for the memory location, whether to store in the buffer at least one of:
data for the memory location; or
parity for a stripe containing the memory location;
read previous data at the memory location;
read previous parity from the parity block in the stripe containing the memory location, wherein the previous parity depends on the previous data;
update parity for the stripe containing the memory location to provide a current parity that depends on the current data;
write the current data using a first memory channel to a first buffer location in the buffer when it is determined to store the data in the buffer; and
write the current parity using a second memory channel into a second buffer location in the buffer when it is determined to store the parity in the buffer.

2. The system of claim 1, wherein the memory includes DRAM, and the buffer includes at least one SRAM buffer.

3. The system of claim 2, wherein:
each of the memory channels has at least one dedicated SRAM buffer; or,
at least two of the two or more memory channels have at least one shared SRAM buffer.

4. The system of claim 1, wherein the memory controller includes a front end configured communicate with a host through one or more input/output lanes, a central controller and a back end configured to exchange data, error and correction information over the two or more memory channels with one or more memory devices, wherein the central controller includes the buffer and the memory is in the one or more memory devices.

5. The system of claim 1, wherein:
the memory controller includes a RAID controller configured to provide a flag for the current data when it is determined to store in the buffer at least one of: the data for the memory location or the parity for a stripe containing the memory location; and
the buffer is configured to detect the flag and respond to the detected flag by writing at least one of the current data to the first buffer location or the current parity to the second buffer location.

6. The system of claim 1, wherein:
the memory location is a first memory location and the current parity in the second buffer location is a first parity; and
the memory controller is configured to:
receive a second write command for writing second current data to a second memory location within the memory, wherein the second memory location corresponds to a second one of the plurality of memory blocks, and the stripe containing the first memory location also includes the second memory location;
determine, for the second memory location, whether to store in the buffer at least one of:
data for the second memory location; or
parity for a stripe containing the first and the second memory locations;
read previous data at the second memory location;
read the first parity from the second buffer location;
update parity for the stripe containing both the first memory location and the second memory location to provide a second parity;
write the second current data to a third buffer location; and
write the second parity using the second memory channel into the second buffer location, the second parity replacing the first parity in the second buffer location.

7. The system of claim 1, wherein the memory controller is configured to perform an eviction procedure according to an eviction policy in preparation to write at least one of new data or new parity to the buffer, the eviction procedure including writing buffered information from at least one of the plurality of buffer locations to the memory, and clearing the buffered information from the at least one of the plurality of buffer locations, the memory controller being configured to change the eviction policy at boot up.

8. The system of claim 1, wherein the memory controller is configured to perform an eviction procedure according to:
an eviction policy that favors keeping buffered parity in the buffer over buffered data; or
a weighted eviction to maintain within the buffer a range of percentages of parity blocks and a range of percentages of data blocks.

9. The system of claim 1, wherein the memory controller is further configured to:

read previous cyclic redundancy check (CRC) information at the memory location;

update the previous CRC information to provide current CRC information accounting for the current data to be written to the memory location; and write the current CRC information into a CRC buffer location in the buffer.

10. The system of claim 1, wherein the memory location is a first memory location and the current parity in the second buffer location is a first parity, and the memory controller is configured to:

receive at the memory controller both a first read command for reading current data from a second memory location within the memory and a prediction that the memory controller will receive a write command to write updated data to the second memory location;

determine, based on the prediction, whether to store in the buffer at least one of:

the read current data for the second memory location; or parity for a stripe containing the second memory location;

read current data from the second memory location;

write the read current data for the second memory location in a third buffer location when it is determined to buffer the read current;

read current parity from the parity block in one of the plurality of stripes containing the second memory location and write the parity for the stripe containing the second memory location in a fourth buffer location when it is determined to buffer the parity for the stripe;

receive at the memory controller the write command to write updated data to the second memory location; and read the at least one of the read current data for the second memory location from the third buffer location or the parity for the stripe containing the second memory location from the fourth buffer location, update parity for the stripe containing the second memory location to provide an updated parity that depends on the updated data, write the updated data to the third buffer location in the buffer when it is determined to store the data in the buffer, and write the current parity to the fourth buffer location in the buffer when it is determined to store the parity in the buffer.

11. A method implemented using a memory and a memory controller configured to communicate with the memory over two or more memory channels, the memory controller including a buffer having a plurality of buffer locations distributed across the two or more memory channels, the method comprising:

receiving at the memory controller a first write command for writing current data to a memory location within a memory, wherein the memory includes a plurality of stripes, each of the plurality of stripes includes a plurality of memory blocks and a parity block, and the memory location corresponds to one of the plurality of memory blocks in one of the plurality of stripes;

determining for the memory location whether to store in the buffer at least one of:

data for the memory location; or parity for a stripe containing the memory location;

reading previous data at the memory location;

reading a previous parity from the parity block in the stripe containing the memory location when it is determined to store the parity in the buffer, wherein the previous parity depends on the previous data;

updating parity for the stripe containing the memory location to provide a current parity that depends on the current data instead of the previous data;

writing the current data using a first memory channel to a first buffer location in the buffer when it is determined to store the data in the buffer; and writing the current parity using a second memory channel into a second buffer location in the buffer when it is determined to store the parity in the buffer.

12. The method of claim 11, further using a RAID controller within the memory controller to selectively provide a flag for the current data when it is determined to store in the buffer at least one of: the data for the memory location or the parity for a stripe containing the memory location, and using the buffer to detect the flag and respond to the detected flag by writing at least one of the current data to the first buffer location or the current parity to the second buffer location.

13. The method of claim 11, wherein the memory location is a first memory location and the current parity in the second buffer location is a first parity, the method further comprising:

receiving at the memory controller a second write command for writing second current data to a second memory location within the memory, wherein the second memory location corresponds to a second one of the plurality of memory blocks, and the stripe containing the first memory location also includes the second memory location;

determining, for the second memory location, whether to store in the buffer at least one of:

data for the second memory location; or parity for a stripe containing the first and the second memory locations;

reading second data at the second memory location;

reading the first parity from the second buffer location;

updating parity for the stripe containing both the first memory location and the second memory location to provide a second parity;

writing the second data to a third buffer location; and writing the second parity using the second memory channel into the second buffer location, the second parity replacing the first parity in the second buffer location.

14. The method of claim 11, further comprising performing an eviction procedure according to an eviction policy in preparation to write at least one of new data or new parity to the buffer, the eviction procedure including writing buffered information from at least one of the plurality of buffer locations to the memory, and clearing the buffered information from the at least one of the plurality of buffer locations.

15. The method of claim 14, wherein the memory controller is configured to change the eviction policy at boot up.

16. The method of claim 14, wherein the eviction policy is configured to:

favor keeping buffered parity in the buffer over buffered data; or perform an eviction procedure according to a weighted eviction to maintain within the buffer a range of percentages of parity blocks and a range of percentages of data blocks.

17. The method of claim 14, further comprising receiving temperature metadata indicative of a prediction of memory location use, and the eviction procedure is configured to determine the at least one of the plurality of buffer locations to clear based on the temperature metadata.

18. The method of claim 11, further comprising:

reading previous cyclic redundancy check (CRC) information at the memory location;

updating the previous CRC information to provide current CRC information accounting for the current data to be written to the memory location; and writing the current CRC information into a CRC buffer location in the buffer.

19. The method of claim 11, wherein the memory location is a first memory location and the current parity in the second buffer location is a first parity, the method further comprising:

receiving at the memory controller both a first read command for reading current data from a second memory location within the memory and a prediction that the memory controller will receive a write command to write updated data to the second memory location;

determining, based on the prediction, whether to store in the buffer at least one of:

the read current data for the second memory location; or parity for a stripe containing the second memory location;

reading current data from the second memory location;

writing the read current data for the second memory location in a third buffer location when it is determined to buffer the read current;

reading current parity from the parity block in one of the plurality of stripes containing the second location and writing the parity for the stripe containing the second memory location in a fourth buffer location when it is determined to buffer the parity for the stripe;

receiving at the memory controller the write command to write updated data to the second memory location; and reading the at least one of the read current data for the second memory location from the third buffer location or the parity for the stripe containing the second memory location from the fourth buffer location updating parity for the stripe containing the second memory location to provide an updated parity that depends on the updated data, writing the updated data to the third buffer location in the buffer when it is determined to store the data in the buffer, and writing the current parity to the fourth buffer location in the buffer when it is determined to store the parity in the buffer.

20. A method implemented using a memory and a memory controller configured to communicate with the memory over two or more memory channels, the memory controller including a buffer having a plurality of buffer locations distributed across the two or more memory channels, the method comprising:

receiving at the memory controller both a first read command for reading current data from a memory location within the memory and a prediction, wherein the memory includes a plurality of stripes, each of the plurality of stripes includes a plurality of memory blocks and a parity block, the memory location corresponds to one of the plurality of memory blocks in one of the plurality of stripes, and the prediction indicates whether the memory controller will receive a write command to write updated data to the memory location or write data to another memory location in the stripe within which the current data is being read;

reading the current data from the memory location;

determining, based on the prediction, whether to store in the buffer at least one of:

the read current data for the memory location; or parity for a stripe containing the memory location;

writing the read current data for the memory location in a first buffer location when it is determined to buffer the read current;

reading the parity for the stripe containing the memory location and writing the parity to a second buffer location when it is determined to buffer the parity for the stripe;

receiving at the memory controller the write command to write updated data to the first location; and reading the at least one of the read current data for the memory location from the first buffer location or the parity for the stripe containing the memory location from the second buffer location, updating parity for the stripe containing the second memory location to provide an updated parity that depends on the updated data, writing the updated data to the first buffer location in the buffer when it is determined to store the data in the buffer, and writing the current parity to the second buffer location in the buffer when it is determined to store the parity in the buffer.

* * * * *